(12) United States Patent
Dickie et al.

(10) Patent No.: US 10,331,645 B2
(45) Date of Patent: *Jun. 25, 2019

(54) DATA-PARTITIONING FOR PROCESSING LOOSELY ORDERED RELATIONS

(71) Applicant: International Business Machines Corporation, Armonk, NY (US)

(72) Inventors: Garth A. Dickie, Framingham, MA (US); Ian R. Finlay, Uxbridge (CA); Dmitry Letin, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 939 days.

This patent is subject to a terminal disclaimer.

(21) Appl. No.: 14/827,574

(22) Filed: Aug. 17, 2015

(65) Prior Publication Data
US 2017/0052990 A1    Feb. 23, 2017

(51) Int. Cl.
*G06F 16/22*     (2019.01)
*G06F 16/23*     (2019.01)
*G06F 16/28*     (2019.01)
*G06F 16/2453*   (2019.01)
*G06F 16/2455*   (2019.01)

(52) U.S. Cl.
CPC .......... *G06F 16/2282* (2019.01); *G06F 16/23* (2019.01); *G06F 16/2456* (2019.01); *G06F 16/24537* (2019.01); *G06F 16/24554* (2019.01); *G06F 16/285* (2019.01)

(58) Field of Classification Search
USPC ....................................................... 707/714
See application file for complete search history.

(56) References Cited

U.S. PATENT DOCUMENTS

| | | | |
|---|---|---|---|
| 6,694,324 B1* | 2/2004 | Shatdal | G06F 17/30477 707/723 |
| 6,795,817 B2* | 9/2004 | Agarwal | G06F 17/30445 |
| 6,973,452 B2 | 12/2005 | Metzger et al. | |
| 8,996,544 B2* | 3/2015 | Ziauddin | G06F 17/30492 707/756 |
| 9,372,889 B1* | 6/2016 | Jakobsson | G06F 17/30463 |
| 2004/0039891 A1* | 2/2004 | Leung | G06F 17/30067 711/165 |
| 2009/0150336 A1 | 6/2009 | Basu et al. | |

(Continued)

OTHER PUBLICATIONS

Jianzhong, L. et al.; "Parallel join algorithms based on parallel B+-trees"; Proceedings of the Third International Symposium on Cooperative Database Systems for Advanced Applications. CODAS 2001, pp. 178-185; IEEE Computer Society; 2000.

(Continued)

*Primary Examiner* — Cam Linh T Nguyen
(74) *Attorney, Agent, or Firm* — Anthony Curro; Edell, Shapiro & Finnan, LLC (57) ABSTRACT

Storage regions in a database are associated with respective intervals including first and second interval values indicating a value range for values within that storage region. The first interval values are sorted into an order that determines a scanning order for a data operation on data in the storage regions. The storage regions are scanned in the scanning order to arrange data from the storage regions in at least a partially ordered sequence for the data operation.

10 Claims, 9 Drawing Sheets

(56) References Cited

U.S. PATENT DOCUMENTS

2012/0278323 A1 11/2012 Chattopadhyay et al.
2015/0106407 A1* 4/2015 Adayilamuriyil ............................
G06F 17/30595
707/804

OTHER PUBLICATIONS

Linux Defenders et al.; "Reliable, Scalable, and High-Performance Distributed Storage: Distributed Object Storage"; An IP.com Prior Art Database Technical Disclosure; http://ip.com/IPCOM/000234957; Feb. 19, 2014.

Linux Defenders et al.; "Reliable, Scalable, and High-Performance Distributed Storage: Data Distribution"; An IP.com Prior Art Database Technical Disclosure; http://ip.com/IPCOM/000234958; Feb. 19, 2014.

U.S. Appl. No. 14/189,095, "Early Exit From Table Scans of Loosely Ordered and/or Grouped Relations Using Nearly Ordered Maps", filed Feb. 25, 2014, 36 pages.

List of IBM Patents or Patent Applications Treated As Related, May 6, 2016, 1 pages.

* cited by examiner

DATA-PARTITIONING FOR PROCESSING LOOSELY ORDERED RELATIONS

BACKGROUND

Present invention embodiments relate to reducing data processing overhead in database applications, and more specifically, to reducing the overhead of data transfer by utilizing information contained in separately-maintained data distribution statistics.

Recent developments in information technology allow organizations to collect, store, integrate and search unprecedented amounts of data. The persistent data storage capacity of modern information systems, such as those that include data warehouses, can be easily increased by adding one or more relatively inexpensive storage/processing; nodes. However, working memory, i.e., that memory that can be directly read from and written to by a data processing unit, e.g., a microprocessor, is typically fixed or otherwise limited to the address space of the data processing unit. Consequently, certain data structures stored in persistent data storage, e.g., database tables, that exceed the working memory capacity must typically be processed in "chunks" that are sized for computational efficiency. Certain database management systems (DBMSs) allow a user to select the size of such chunks for a given computing environment, which is largely defined by the working memory capacity.

Moving data from persistent data storage into working memory for purposes of data processing constitutes overhead in any data processing operation, but such is particularly problematic where massive amounts of data are concerned. Minimizing this overhead is thus an ongoing research and product development concern.

SUMMARY

According to one embodiment of the present invention, storage regions in a database are associated with respective intervals including first and second interval values indicating a value range for values within that storage region. The first interval values are sorted into an order that determines a scanning order for a data operation on data in the storage regions. The storage regions are scanned in the scanning order to arrange data from the storage regions in at least a partially ordered sequence for the data operation.

BRIEF DESCRIPTION OF THE DRAWINGS

Generally, like reference numerals in the various figures are utilized to designate like components.

DETAILED DESCRIPTION

Database queries may frequently sort, group, cluster and join data that exceeds its local processing storage capacity, e.g., random access memory (RAM). To mitigate data scanning for locating applicable data, table-characterizing metadata, e.g., data distribution statistics, may be assembled and stored. Such metadata may be indicative of spans of ranked or otherwise ordered data and may include a first interval value representing a least-significantly ranked data item for each column, for each range of rows, and a second interval value representing a most-significantly ranked data item for each column, for each range of rows. Both the first and second interval values represent types of metadata that may be assembled to characterize various regions of storage. For purposes of description and not limitation, metadata that characterize database data by region of storage will be referred to herein as "data distribution statistics." The use of data distribution statistics to identify particular data spans within a storage region, according to present invention embodiments, afford performance of certain data processing operations in a manner that reduces disk scan time and data processing load.

Figure 1:
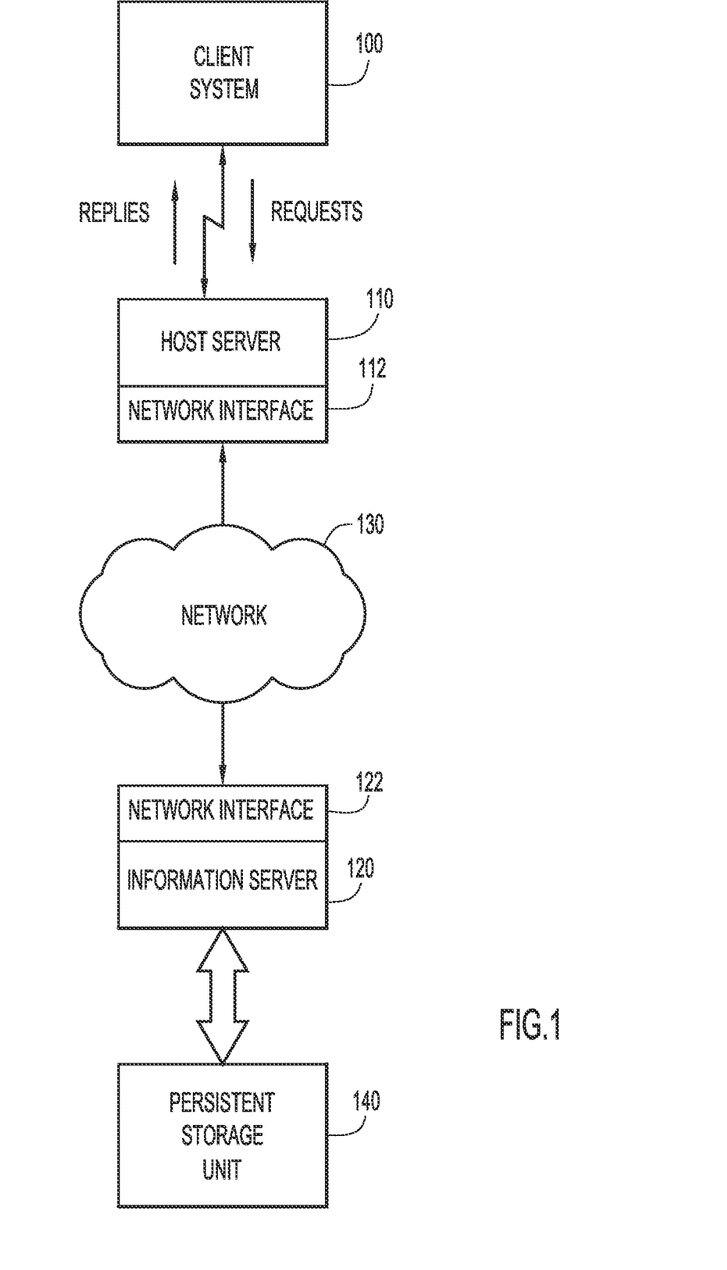
FIG. 1 is an illustration of an example computing environment for use with an embodiment of the present invention.

With reference now to FIG. 1, an example computing environment for use with present invention embodiments is illustrated. Specifically, the environment includes one or more client or end-user systems 100 and one or more server systems 110 and 120. Host server system 110 and information server 120 may be remote from each other and may thus communicate over a network 130. Query requests, originating from client system 100 may be transmitted to information server 120 to search stored data on database storage unit 140. Network 130 may be implemented by any number of any suitable communications media (e.g., wide area network (WAN), local area network (LAN), Internet, Intranet, etc.). Alternatively, server systems 110 and 120 may be local to each other, and communicate via any appropriate local communication medium (e.g., local area network (LAN), hardwire, wireless link, Intranet, etc.). Network interface units that implement the signaling circuitry and communication protocols to carry out such communication are shown at 112 and 122.

Client system(s) 100 enable users to access information server system 120 for purposes of data storage in a database storage unit 140 and for purposes of performing database queries and other data processing operations.

Persistent storage unit 140 may store information for and resulting from analysis (e.g., results of a SORT, GROUP BY, JOIN, etc.), and may be implemented by any conventional or other database management techniques on conventional or other data storage equipment. Persistent storage unit 140 may be local to or remote from information server 120, and may communicate via any appropriate communication medium (e.g., local area network (LAN), wide area network (WAN), Internet, hardwire, wireless link, Intranet, etc.). Client system 100 may present a graphical user (e.g., GUI, etc.) or other interface (e.g., command line prompts, menu screens, etc.) to solicit information from users pertaining to the desired data and analysis, and may provide reports including analysis results.

A plurality of persistent storage units 140 may be present in data warehouse embodiments. An information server 120 may store and retrieve information from persistent storage unit 140, such as from a database, at the direction of host server 110. Host server 110 receives requests from and replies to client system 100. In one embodiment, the memory space within persistent storage unit 140 may be divided into several partitions, including a primary partition for storing user information, a mirror partition for storing a backup copy of the primary information, a temporary partition for holding intermediate results at the direction of information server 120, and a core partition for holding information about the physical layout of information within the persistent storage unit 140. It is to be understood that storage space partitions, by which data files are distributed and maintained by a distributed file manager, are not to be confused with database partitions, by which database tables are distributed and maintained by a database management system. It is to be understood as well that transient partitioning may be performed during certain data processing operations, e.g., JOIN, GROUP BY, SORT, or clustering process, which is distinct from both storage space partitioning and database partitioning. Transient partitioning may be performed on data from various data storage partitions, in parallel, in order to produce data structures that fit into working memory.

Figure 2:
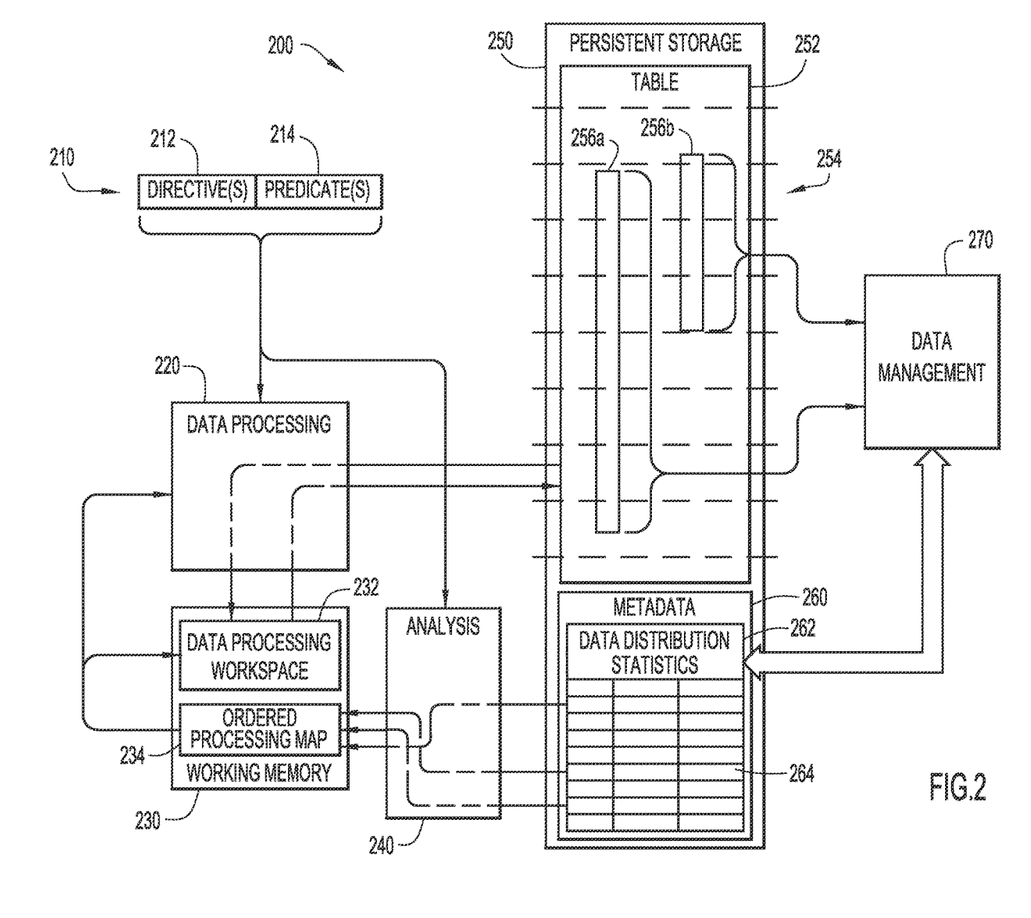
FIG. 2 is schematic block diagram of an information service system according to an embodiment of the present invention.

FIG. 2 illustrates several functional components of an information service system (ISS) 200, by which informational data are stored and are processed in accordance with user specifications. The functional components of ISS 200 include a data processing component 220, a working memory component 230, an analysis component 240, a persistent storage component 250, and a data management component 270, which may be realized through processing and storage resources on information server 120 and persistent storage unit 140. It is to be understood that FIG. 2 is a simplified abstraction of a fully implemented ISS 200 for purposes of explaining certain salient features of the present invention. As will be readily recognized and appreciated by those skilled in information and database systems, ISS 200 may be incorporated into other, potentially more complex systems and can be represented through additional and/or different abstraction layers. Additionally, it is to be understood that, in addition to the particular functionality described herein, the illustrated functional components of ISS 200 may also realize functionality that is consistent with their conventional counterparts. Those having skill in the art will understand such functionality without the need for explicit implementation details being set forth herein and, as such, such conventionally understood details will be omitted from the descriptions that follow.

Persistent storage component 250 may be constructed or otherwise configured to store structured data relations such as database tables, representatively illustrated at table 252. For purposes of explanation and not limitation, it is to be assumed that table 252 is logically constructed in persistent storage component 250 as a plurality of rows and columns of data. It is to be understood, however, that the present invention is not limited to tabular data and, upon review of this disclosure, other data structures that can be used in conjunction with the present invention will be recognized and appreciated by those having skill in the data processing arts.

In certain applications, e.g., data warehousing, data are collected, formatted and stored in a database, such as in table 252, on a continual basis. Certain types of data arrive at the data ingest point in a natural order; for example, time-stamped event data typically arrive at a data ingest device in temporal order. Other types of data are arranged in a particular order, even by happenstance, and such order may coincide with that requested by a user, such as by a table SORT operation. As is explained in more detail below, embodiments of the present invention leverage such ordering in a database to improve operational efficiency in various data processing operations, R is to be understood that the term "order," as used herein, should not be strictly construed to conventional sequences and those having skill in the database arts will recognize numerous ordinal scales that can be used in conjunction with the present invention without departing from the spirit and intended scope thereof.

Persistent storage component 250 may also store metadata 260 that, among other things, describe various characteristics of the data stored therein. In certain embodiments, metadata 260 may include data distribution statistics 262 that indicate the manner in which data are organized in table 252 (as well as of other tables stored in persistent storage component 250). Data distribution statistics 262 may include metadata 264 that describe spans of data in table 252, representatively illustrated by data spans 256a and 256b and representatively referred to herein as data span(s) 256. As used herein, a "data span" is an organization of ordinal data, i.e., data that can be ordered in accordance with a predetermined ranking from the least-significantly ranked data item to the most-significantly ranked data item in the span. For example, data span 256a may include temporally-sequenced data, e.g., timestamps, arranged in a column of table 252 across a number of its rows and data span 256b may include numerically-sequenced data arranged in another column of table 252 across a number of its rows. As illustrated in FIG. 2, data spans 256 may overlap, e.g., a single row of data may be included in data spans 256 that are defined in multiple columns. Each data span 256, or sub-span thereof as will be described below, may be represented in data distribution statistics 262 by an indicator of the data type, e.g., via a column identifier, and by the corresponding least-significantly ranked and most-significantly ranked data items in the particular data span. For example, temporally-sequenced data span 256a may be characterized by the earliest and latest timestamps in the data span, and numerically-sequenced data span 256b may be characterized by the minimum and maximum values contained in the data span. Such characterization of data spans 256, as well as other functions relating to metadata contained in data distribution statistics 262 may be realized by data management component 270.

As illustrated in FIG. 2, persistent storage component 250 may be logically divided into a plurality of storage regions, representatively illustrated at storage region 254. A storage region 254 represents a predetermined unit of memory allocation in persistent storage component 250 for purposes of database storage. The present invention is not limited to a particular memory allocation scheme; for purposes of description and not limitation, it is to be assumed that each storage region 254 has a predetermined storage capacity sufficient to store a predetermined number of rows and columns of table 252. When it is required that rows be added to table 252, data management component 270 may allocate one or more additional storage regions 254 and data distribution statistics 262 may be suitably updated. Since table 252 may occupy a potentially large number of storage regions 254 and a particular data span 256 may be spread across multiple storage regions 254, data management component 270 may create an entry 264 in data distribution statistics 262 for the portion of data spans 256 falling within each storage region 254. In certain embodiments, each entry 264 in data distribution statistics 262 may represent a sub-span, or "partition" of a corresponding data span 256 and each such sub-span may be represented in data distribution statistics 262 by the least-significantly ranked and most-significantly ranked data items contained in that storage region 254.

Figure 3:
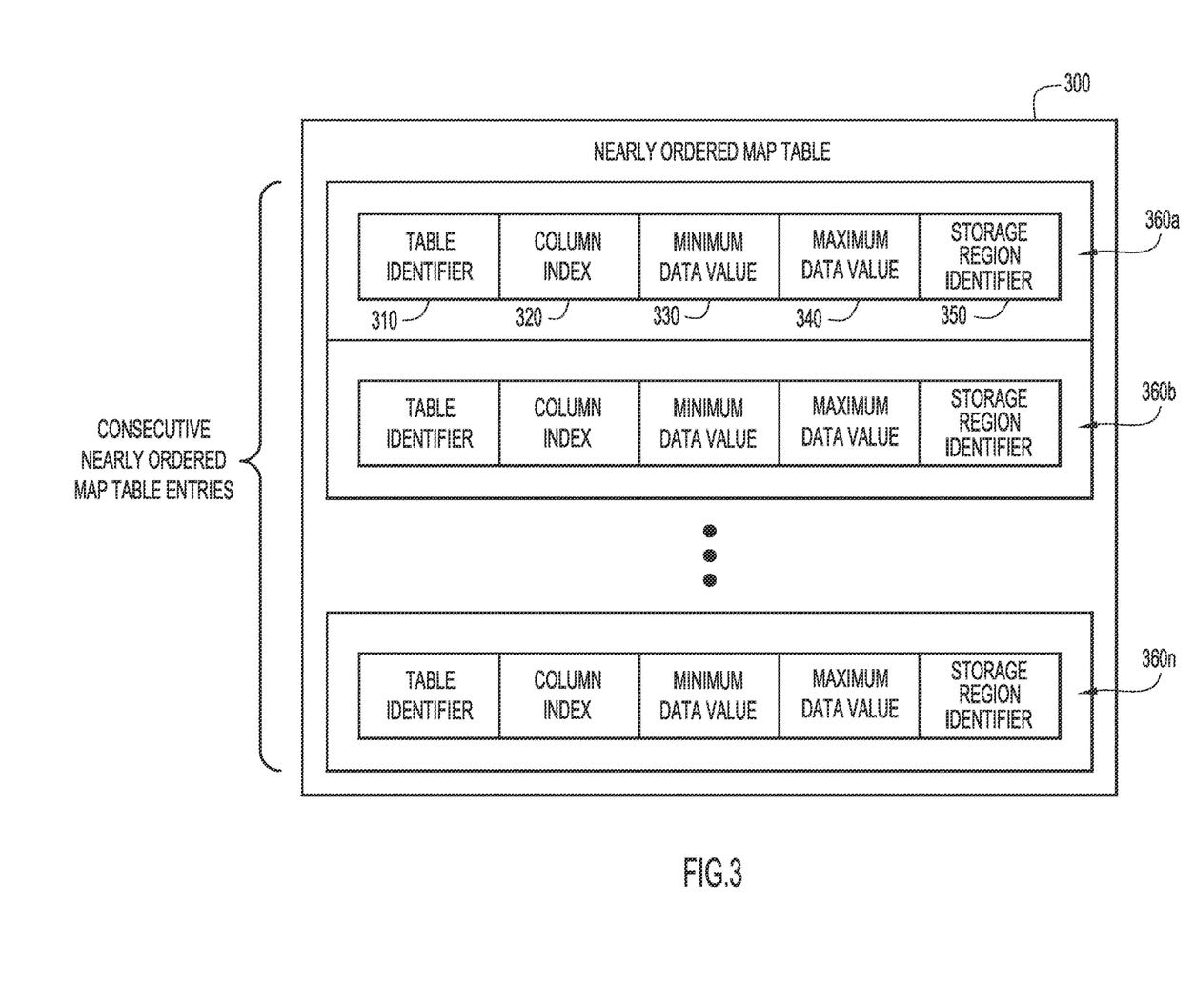
FIG. 3 is an illustration of an example of metadata corresponding to regions of table storage according to an embodiment of the present invention.

Turning momentarily to FIG. 3 an example of data distribution statistics 262 according to an embodiment of the present invention is illustrated, which is referred to herein as a nearly ordered map table (NOMT) 300. As illustrated in FIG. 3, NOMT 300 shows an entry structure comprising a table identifier 310, a column index 320, a minimum data value 330, a maximum data value 340, and a storage region identifier 350. Multiple entries of metadata are shown at 360a-360n, representatively referred to herein as a NOMT entry (or entries) 360. Table identifier 310 uniquely designates an information space, such as database table 252. Column index field 320 uniquely identifies a particular class of information within the information space identified by the table identifier 310. In one embodiment, column index 320 denotes a column in the relational table identified by the table identifier 310. In certain embodiments, column index value 320 may correspond to the order in which columns are defined within the relational database table.

In one embodiment of the invention, minimum data value field 330 and maximum data value field 340 hold different types of data values, including dates, times, date-times, integer values, etc. The actual types of data held by the minimum data value 330 and the maximum data value 340 may be specified in the definition of the column that is denoted by the column index 320. Storage region identifier 350 may designate a particular storage region within the information space identified by table identifier 310.

As illustrated in FIG. 3, NOMT entries 360 may themselves be nearly-ordered in NOMT 300. In certain cases, a particular data span 256 may be represented in NOMT 300 by consecutive entries 360, each entry 360 containing metadata of a sub-span of the data span 256. Accordingly, a single data span 256 that crosses multiple storage regions 254 can be identified by analyzing the content of NOMT entries 360. Such analysis may be performed by analysis component 240.

In certain embodiments, multiple NOMT 300 may be maintained in metadata storage 260, each separately representing a corresponding data span 256. When so embodied, the same storage region 255 may be identified in separate NOMTs 300, such as when data spans 256 overlap. However, the present invention is not so limited; a single NOMT 300 can be maintained, in which case the same storage region 256 may be referenced in separate NOMT entries 360.

Returning now to FIG. 2, operation of ISS 200 will be further described through an exemplary data processing flow. Data processing may occur in response to a data processing specification 210 that specifies the desired operation(s). In certain embodiments, data processing specification 210 comprises one or more directives 212, e.g., instructions given in the syntax of a database programming language, such as the well-known structured query language (SQL) and, optionally, one or more predicates 214 that define bounds or conditions on directives 212. The present invention is not limited to particular database paradigms, but, for purposes of explanation, the examples described herein will be consistent with the well-known structured query language (SQL).

Data processing specification 210 may be provided to data processing component 220, which carries out directive 212 in view of predicates 214, and to analysis component 240, which analyzes data processing, specification 210 to determine and/or otherwise identify procedural interventions that reduce the number of table data transfers between persistent storage component 250 and working memory component 230, such as by leveraging metadata contained in data distribution statistics 262. In one embodiment, analysis component 240 generates an ordered processing map 234, which may be stored in working memory component 230. Ordered processing map 234 may be a data structure of logical addresses (references) of storage regions 254 containing applicable data spans 256 as determined from data processing specification 210 The references to the applicable storage regions 254 may be determined from data distribution statistics 262, e.g., from storage region identifiers 360 of NOMT 300. As explained further below, ordered processing map 234 may define the manner in which data from table 252 are to be processed based on how the data are distributed over storage regions 254 in view of the particular data processing specification 210.

Upon completion of ordered processing map 234 and/or, to the extent possible, in parallel with construction of ordered processing map 234 data from table 252 are retrieved, where necessary, from persistent storage 250 and stored in data processing workspace 232 for processing by data processing component 220. Such retrieval may be referred to herein as "scanning," and ordered processing map 234 may define the order in which storage regions 254 are scanned. Data processing may then be carried out by data processing component 220 in accordance data processing specification 210 using information contained in ordered processing map 234. For example, in certain data processing procedures that specify and/or rely on the data order (ranking) of data in table 252, storage regions 254 that are already in the specified order as determined from data distribution statistics 262, e.g., a "partition" of a particular data span 256, may be excluded from data processing and can remain in persistent storage 252, In such a case, only those storage regions 254 containing data that are not in the prescribed order need to be transferred from persistent storage 250; those storage regions 254 that are already in We prescribed order can be inserted into a data processing thread using respective references to those storage regions 254, such as those references contained in ordered processing map 234. The processed data may then be returned to persistent storage 250, either by replacing table 252 with processed data or by inserting the processed data into a new table 252. When such a change occurs in table 252, data management component 270 may update data distribution statistics 262 to correspond to the new data configuration. In certain data processing cases, the updated data distribution statistics 262 may be used to generate and/or update ordered processing map 234 and the table data may undergo another iteration of data processing based on the updated ordered processing map 234. Such iteration may be repeated as necessary to complete the data processing under size constraints of data processing workspace 232.

A certain number of storage regions 254 can be processed efficiently by ISS 200 at any one time and data processing workspace 232 may be sized accordingly. In certain embodiments, analysis component 240 may redefine the manner in which data spans are partitioned based on the size of data processing workspace 232. Such partitioning may be used to logically reorganize the data in table 252 to reduce the number of data transfers to and from persistent storage component 250. For example, as indicated above, a storage region 254 containing only those data corresponding to a prescribed arrangement, e.g., having maximum and minimum values defining a range interval values, can be indicated to by reference and the data themselves can remain in persistent storage component 250 until such time that those data require further processing. Accordingly, as is illustrated in detail below, partitioning of the data in working memory can be used to align ordered data on storage region boundaries. Additionally, such partitioning can be performed over multiple iterations, each iteration retrieving only what data is necessary and using, data references where possible, Thus, data processing of significant amounts of table data can be achieved with a significant reduction of data transfers between persistent storage component 250 and working memory component 230 over conventional database processing techniques.

FIGS. 4-7 are examples of various database procedures using an embodiment of the invention, such as ISS 200 illustrated in FIG. 2 implemented in the computing environment illustrated in FIG. 1 and using the NOMT 300 of FIG. 3 to serve as data distribution statistics 262. Those skilled in the database and information infrastructure arts may recognize procedures other than those of FIGS. 4-7 that can be performed on embodiments of the present invention upon review of the following examples.

Figure 4:
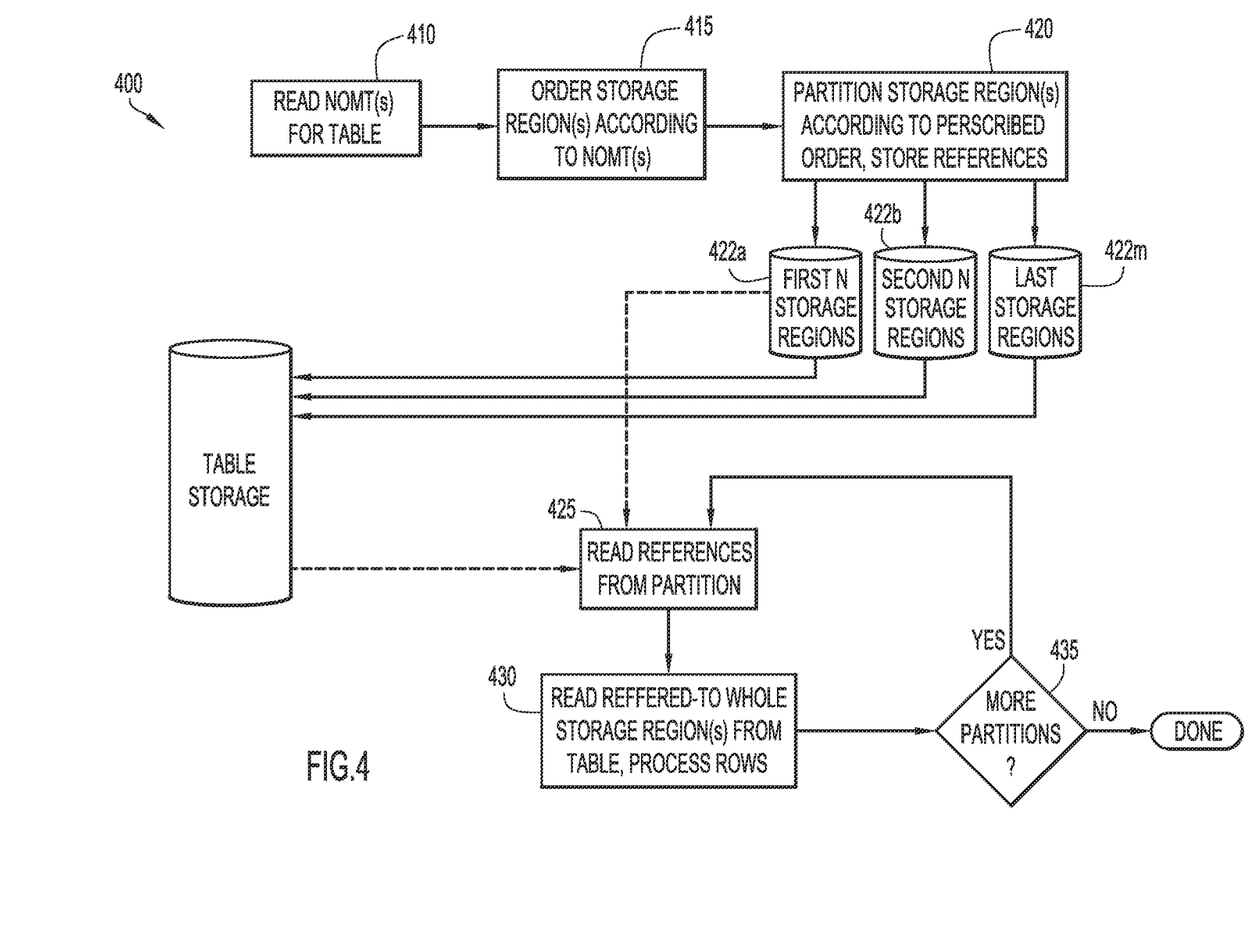
FIG. 4 is a procedural flow chart generally illustrating a data partitioning process according to an embodiment of the present invention.

FIG. 4 is a flow diagram of an exemplary data partitioning process 400 by which embodiments of the present invention can reconfigure data in a database table, e.g., table 252, for purposes of reducing the number of data transfers between persistent storage, e.g., persistent storage component 250, and working memory, working memory component 230. In operation 410, the NOMT associated with a table are read to determine the maximum and minimum of the range intervals and associated storage regions involved in the database operation to be performed, e.g., SORT, GROUP BY, JOIN, etc. In operation 415, the order of access to the applicable storage regions is determined based on the ordering or otherwise ranking of the maximum or minimum of the range intervals, and, in operation 420, references, e.g., logical addresses or storage region identifiers 350, to the storage regions are stored in data partitions 422a-422m, representatively referred to herein as data partition(s) 422, in accordance with the prescribed data order. For example, references to the first N storage regions may be placed in partition 422d, reference to the second N storage regions may be stored in partition 422a and references to any remaining storage regions may be stored in partition 422m. It is to be noted that in the foregoing partitioning, none of the pages themselves are actually read; all of the information necessary to order or otherwise rank the data are contained in the NOMTs. Additionally, the data themselves stored within the respective partitions 422 need not be in We prescribed order, which may be achieved through other processing operations (such as those in the paragraphs that follow). Further, it is to be understood that the number of partitions M and the number of storage regions N may be independently selected based on the processing being performed.

Operation 420 may only require that data partitions 422 are in the prescribed order relative one with the others with respect to the data respectively contained in each data partition 422. One skilled in the data processing arts will also recognize that data partition(s) 422 may be stored temporarily in the data processing workspace 232 or persistent storage 250.

In operation 425, data processing proceeds by reading the storage region references from one of partitions 422a-422m. In operation 430, whole storage regions referred to by the storage region references are retrieved and the rows therein are processed in accordance with the applicable data processing specification, e.g., ordering or ranking all of the data one item relative to the others. In operation 435, it is determined whether all partitions have been processed and, if not, process 400 returns to operation 425 and continues from that point.

Figure 5:
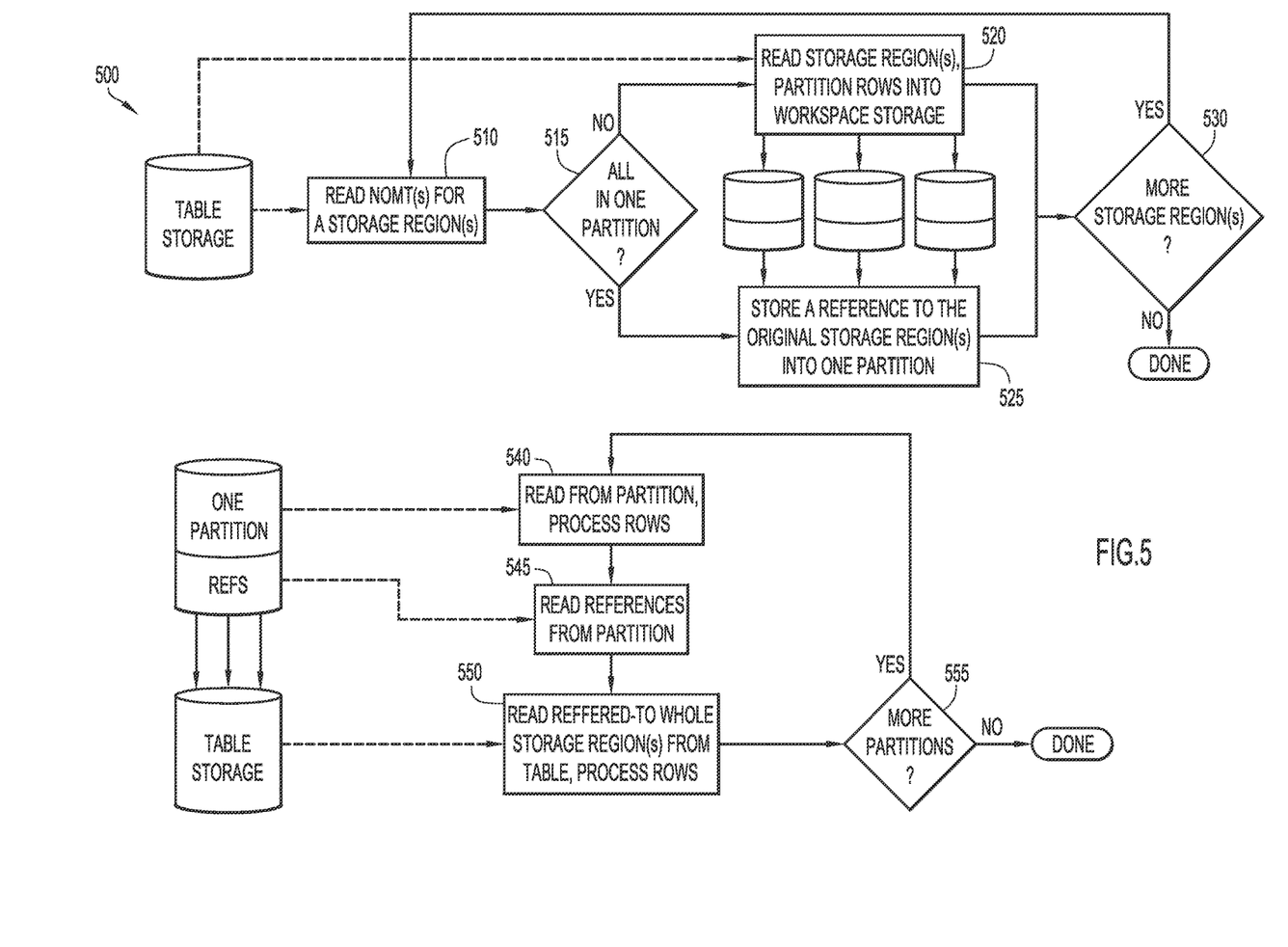
FIG. 5 is a procedural flow chart generally illustrating another data partitioning process according to an embodiment of the present invention.

FIG. 5 is a flow diagram of another exemplary data partitioning process 500 by which embodiments of the present invention can perform various database operations, e.g., SORT, GROUP BY, JOIN, etc. In operation 510, an NOMT is read and a storage region within the applicable data span is identified. In operation 515, it is determined whether the identified storage region contains only data that fit in a single data partition in accordance with the order or ranking prescribed by the specified database operation. If not, process 500 transitions to operation 520, by which the storage region is read from persistent memory, and the rows in the storage region are respectively stored into the partitions to which they belong according to the order specified by the database operation. The data partitions may be formed in working memory, such as in data processing workspace 232. If the data in the identified storage region does fit into a single partition, as determined in operation 515, process 500 may transition to operation 525, by which a reference to that storage region is stored in the corresponding partition in workspace storage without the storage region itself actually being retrieved from persistent storage. In operation 530 it is determined whether applicable storage regions remain to be processed, as determined from the data processing specification and the NOMT. If so, process 500 transitions back to operation 510 and continues from that point. If no storage regions remain, as determined in operation 530, process 500 transitions to operation 540.

In operation 540, data from one of the partitions in workspace storage are read and the rows of the partition are processed in accordance with the applicable data processing specification. In operation 545, the storage region references are read from the partition and, in operation 550, the storage regions to which the references refer are retrieved and the rows contained therein are also processed in accordance with the data processing specification. In operation 555, it is determined whether there are remaining partitions to be processed and, if so, process 500 transitions back to operation 540, by which the next partition is read.

Figure 6:
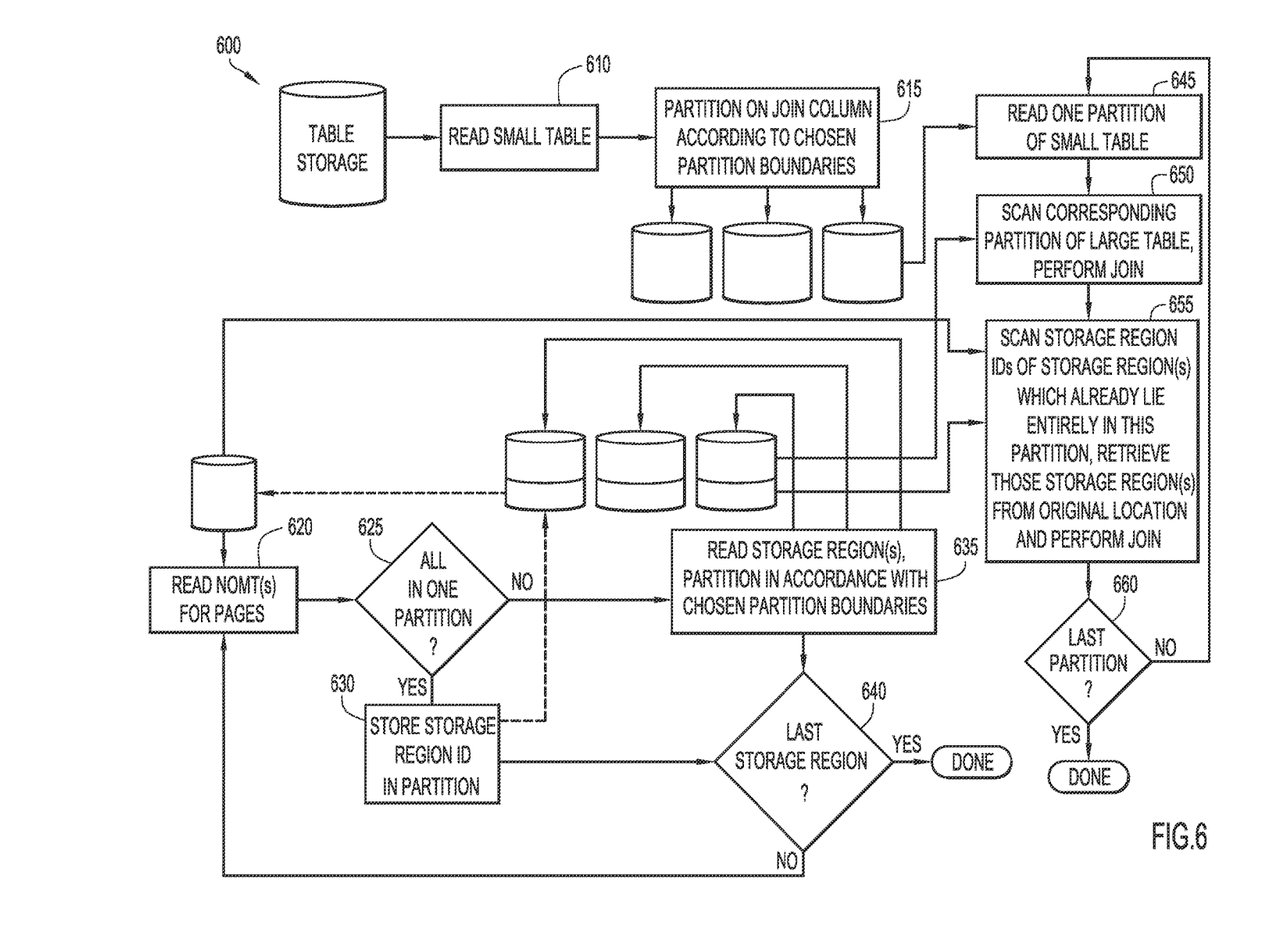
FIG. 6 is a procedural flow chart generally illustrating a join process according to an embodiment of the present invention.

FIG. 6 depicts an exemplary join process 600 of data in two tables using an embodiment of the present invention. Exemplary join process 600 utilizes techniques described above to perform a JOIN operation and, as will be recognized and appreciated by those skilled in the pertinent arts, other database processing operations can be performed using similar techniques.

In operation 610, the smaller of the join tables is read and, in operation 615, the small table is partitioned on the join column in accordance with chosen partition boundaries. Partition boundaries may, for example, be chosen in accordance with the size of the data processing workspace. Partition boundaries may also be chosen based on optimization techniques that seek to minimize processing on either the smaller or larger of the join tables, such as described for operation 520 and/or operation 625. When so embodied, partitions may be maximized to qualify for operation 545 or operation 630 and/or based on partitioning needs of later database operations. The present invention is not limited to particular partitioning schemes; any number of partitioning optimizations and schemes that are known. to one skilled in the pertinent arcs may be used in conjunction with the present invention without departing from the spirit and intended scope thereof. In operation 620, an NOMT associated with the larger of the join tables is read and a storage region is identified that contains data from the applicable join column. In operation 625, it is determined whether the data in the storage region is contained in a single partition, as explained above. If not, process 600 transitions to operation 635, by which the storage region is read and row-wise partitioned in accordance with the chosen partition boundaries. If, however, the data in the storage region falls within a single partition, join process 600 may transition to operation 630, by which a reference to the storage region, e.g., a storage region ID, such as storage region identifier 350, is stored in the corresponding partition. In operation 640, it is determined whether the last storage region has been read and if not, process 600 transitions back to operation 620, by which another storage region is selected from the NOW, and process 600 continues from that point. If however, the last storage region in the NOMT has been processed, process 600 may proceed to the join operation.

In operation 645, one of the partitions of the small table is read and, in operation 650, the corresponding partition of the large table is scanned and the join operation is performed on the two partitions. In operation 655, the references to the storage regions falling entirely in the partition are read and the corresponding storage regions are retrieved from their respective original locations in persistent storage. The data in the retrieved storage regions are then joined with the small table data. In operation 660, it is determined whether all partitions for the JOIN operation have been processed and, if not, join process 600 returns to operation 645 by which the next partition is read. Process 600 repeats from that point.

In the foregoing example, the smaller table is scanned in its entirety and partitioned into memory; although it is to be understood that the present invention is not so limited. Indeed, the "smaller table" could still be very large and have overlapping interval ranges and/or data spans. Accordingly, the smaller table may be processed in a manner similar to that of the larger table. For example, operations 610-645 of join process 600 may be replaced by, for example, process 500 illustrated in FIG. 5. Indeed, all of the techniques described herein may be combined in whole or in part, for purposes of reducing operational overhead in processing data.

Figures 7A, 7B, 7C:
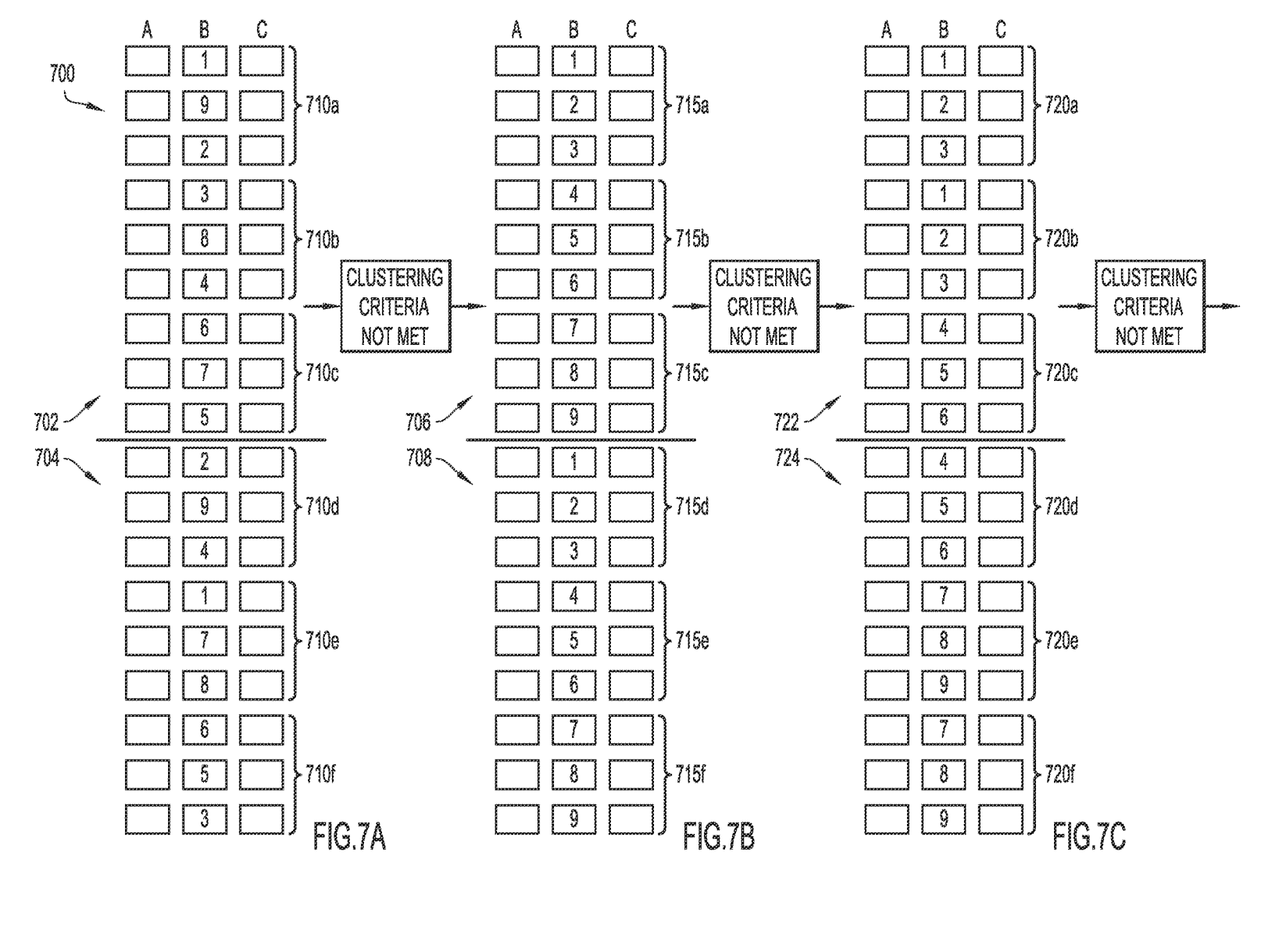
FIGS. 7A-7G, collectively referred to herein as FIG. 7, depict a table undergoing exemplary grouping or clustering according to an embodiment of the present invention.
Figures 7D, 7E, 7F:
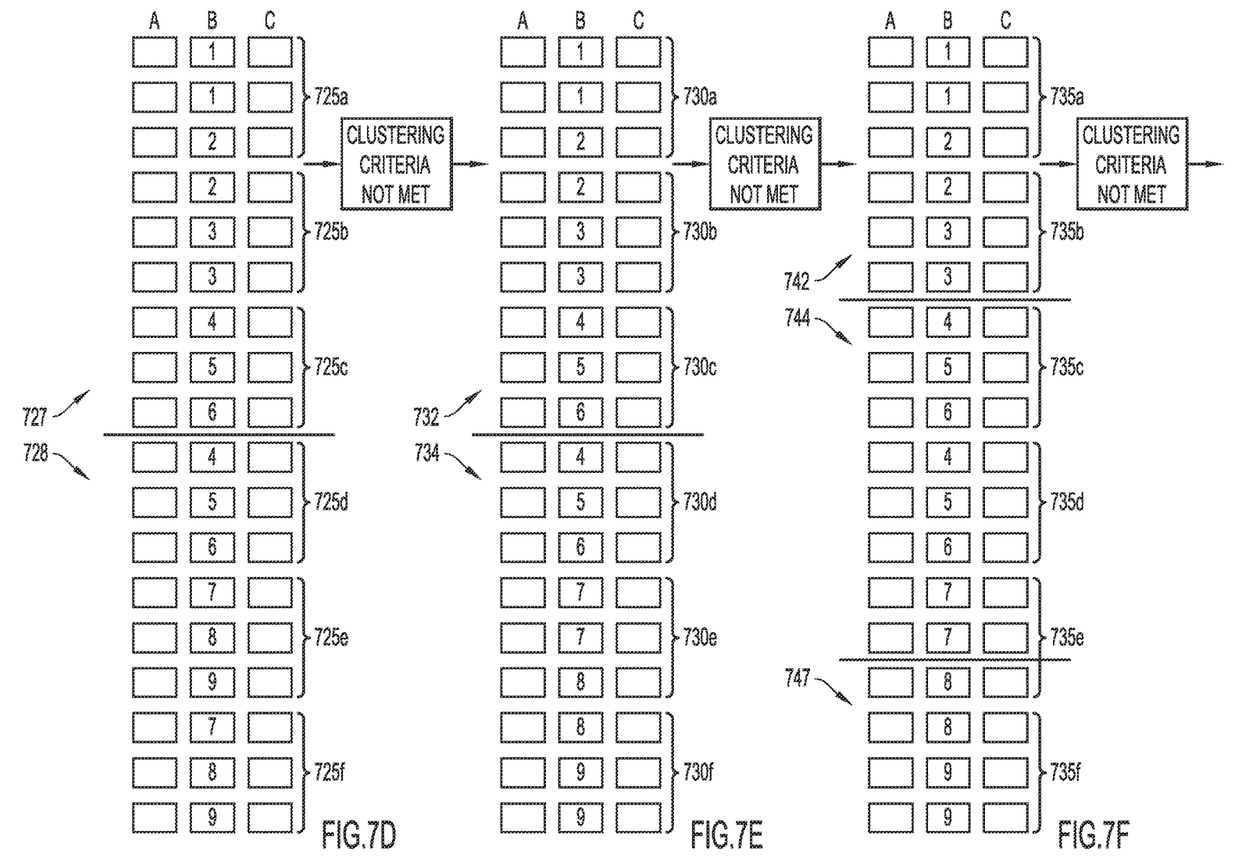
Figure 7G:
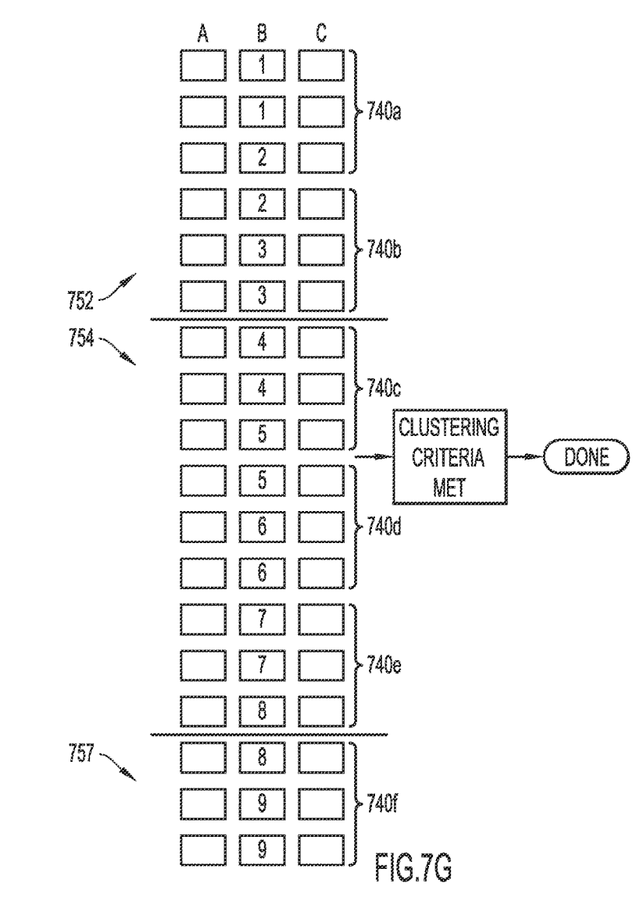

FIGS. 7A-7G, collectively referred to herein as FIG. 7, depict a table undergoing exemplary grouping or clustering using an embodiment of the present invention. Clustering may be on one or more table columns, such as on the primary key of a table a table column that is often used in either local or join predicates in a query (e.g., a foreign key). One might seek to cluster on state, and then within state cluster/order on certain data, e.g., customer ID. Such clustering may be performed using data partitioning flows similar to those described above but are described using table representations in that such is more efficient in explaining the inventive concept.

FIG. 7A depicts an initial configuration of table 700; it comprises 18 rows distributed across six (6) storage regions 710a-710f of three (3) rows each. Table 700 has been initially partitioned in two partitions 702 and 704 of three (3) storage regions each, by partitioning operations similar to those described above. It is to be understood the present invention is not limited to a particular rows-per-storage region and/or storage region-per-partition, which will depend on the application in which the present invention is embodied. In the illustrated example, it is to be assumed for purposes of explanation and not limitation that nine (9) rows can be processed by a particular storage/processing node in a single clustering operation due to memory constraints (a typical limit may be 9 million or 9 billion rows depending on the working memory capacity).

The exemplary clustering technique described below is an iterative process that achieves a desired data configuration over several operational passes. Accordingly, at the conclusion of each operational pass, it is determined whether the data are configured in accordance with a prescribed clustering criterion. If the clustering criterion is met, no more operational passes are required and the process terminates. If however, the clustering criterion is not met, another iteration of the clustering process is performed. In the following example, it is to be assumed that data of a particular column are clustered within chosen partition boundaries and the process iterates until, for example only a predetermined maximum number of partition boundaries are crossed by the data or until, for example, no improvement in clustering is achieved in consecutive iterations. As illustrated in FIG. 7, it is to be assumed that the data configurations of FIGS. 7A-7F do not meet the specified clustering criterion, which is ultimately met when the data are configured as illustrated in FIG. 7G.

Subsequent to a first pass, table 700 is clustered as illustrated in FIG. 7B, i.e., in a partition-wise sequential order with storage regions 715a-715f across partitions 706 and 708. In a next pass of the clustering operation, storage regions 715a-715f are reordered in accordance with their respective minimum/maximum values and, subsequently, table 700 is configured as illustrated in FIG. 7C, with storage regions 720a-720f across partitions 722 and 724. FIG. 7D illustrates table 700 subsequent to a further pass of the clustering process (in 9-row batches) having been completed to comprise storage regions 725a-725f across partitions 727 and 728. FIG. 7E illustrates table 700 after a similar pass in which like values in a different partition are grouped, resulting in storage regions 730a-730f across partitions 732 and 734. Table 700 depicted in FIG. 7E may undergo a perturbation of the partition boundaries, resulting in storage regions 735a-735f across partitions 742, 744 and 747 illustrated in FIG. 7F. Finally, the new partitions are clustered into partitions 752, 754 and 757 comprising storage regions 740a-740f, as depicted in FIG. 7G. It is to be noted that each partition 752, 754 and 756 contains no more than the nine (9) rows that can be processed in a given operation and that only two storage regions, namely 740e and 740f, contain data that crosses a partition boundary, i.e., the boundary between partitions 754 and 757. Accordingly, in later database operations, storage regions 740a-740d can be incorporated into the database operation by a suitable reference, e.g., respective storage region identifiers 350, as described above.

Server systems 110 and 120, and client system 100 may be implemented by any conventional or other computer systems preferably equipped with a display or monitor, a base (including, for example, at least one processor, one or more memories and/or internal or external network interfaces or communications devices (e.g., modem, network cards, etc.)), optional input devices (e.g., a keyboard, mouse or other input device), and any commercially available and custom software (e.g., server/communications software, module, browser/interface software, etc.).

Alternatively, one or more client systems 100 may operate as a stand-alone unit, by which the client system 100 stores or has access to the data (e.g., database tables, etc.), and includes at module to interface with a user. A graphical user (e.g., GUI, etc.) or other interface (e.g., command line prompts, menu screens, etc.) may solicit information from a corresponding user pertaining to the desired documents and analysis, and may provide reports including analysis results.

It will be appreciated that the embodiments described above and illustrated in the drawings represent only a few of the many ways of implementing embodiments for pseudo partitioning databases to mitigate memory constraints.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices etc.), and may include any commercially available operating system and any combination of commercially available and custom software (e.g., browser software, communications software, server software, profile generation module, profile comparison module etc.). These systems may include any types of monitors and input devices (e.g., keyboard, mouse, voice recognition, etc.) to enter and/or view information.

It is to be understood that the software (e.g., partitioning processes 400 and 500, join process 600, grouping/clustering process of table 700) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control (e.g., data processing component 220, analysis component 240, and data management component 270). The computer systems of the present invention embodiments may alternatively be implemented by any type of hardware and/or other processing circuitry.

The various functions of the computer or other processing systems (e.g., data processing component 220, analysis component 240, and data management component 270) may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., data partitioning processes 400 and 500, join process 600, grouping/clustering process of table 700) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., collected data, tables, data distribution statistics, etc.). The database system may be implemented by any number of any conventional or other databases, data stores or storage structures (e.g., files, databases, data structures, data or other repositories, etc.) to store information (e.g., database partitioning information, data distribution statistics, etc.). The database system may be included within or coupled to the server and/or client systems. The database systems and/or storage structures may be remote from or local to the computer or other processing systems, and may store any desired data that can be incorporated into a database.

The present invention embodiments may employ any number of any type of user interface (e.g., Graphical User Interface (GUI), command-line, prompt, etc.) for obtaining or providing information (e.g., data processing specifications, database queries and results therefore), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for pseudo-partitioning databases for database queries and other data operations including database administration and maintenance.

The terminology used herein is for the purpose of describing particular embodiments only and is not intended to be limiting of the invention. As used herein, the singular forms "a", an and "the" are intended to include the plural forms as well, unless the context clearly indicates otherwise. It will be further understood that the terms "comprises", "comprising", "includes", "including", "has", "have" "having", with and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus to perform a data operation comprising:
a persistent storage component logically separated into a plurality of storage regions, each of the storage regions storing rows of a data table, including column data, and being associated with an interval including first and second interval values indicating a value range for values of a data item of the column data across the rows stored within that storage region;
a working memory component;
a processor configured to:
order the first interval values of a plurality of data distribution statistics entries stored within the persistent storage component, each of the plurality of data distribution statistics entries corresponding to a respective storage region of the plurality of storage regions, wherein an order of the first interval values determines a scanning order for the plurality of storage regions;
define a plurality of data partitions in the working memory component, the data partitions having respective partition boundaries that define respective value ranges for values of the data item, the defining of the plurality of data partitions logically reorganizing data in the data table to reduce a number of data transfers between the persistent storage component and the working memory component by limiting a number of the partition boundaries that are crossed by any of the respective value ranges to a predetermined maximum number;
scan at least some of the plurality of storage regions in the scanning order into the plurality of data partitions to arrange data from the storage regions in at least a partially ordered sequence for the data operation; and
perform the data operation on the data in the plurality of data partitions one data partition at a time.

2. The apparatus of claim 1, wherein the processor is further configured to:
store, in the corresponding data partitions, logical references to any of the storage regions for which the first interval value and the second interval value fall completely within the partition boundaries of the corresponding data partition; and
delay the scanning of the storage regions for which logical references thereto are stored in the corresponding data partitions until the first interval values and the second interval values of all of the storage regions have been compared to the partition boundaries.

3. The apparatus of claim 2, wherein the data operation includes joining a first table and a second table, the processor being further configured to:
scan the storage regions of the first data table into a corresponding first set of the partitions;
store, in a corresponding second set of the data partitions, the logical references to any of the storage regions of the second table for which the first interval value and the second interval value thereof fall within the partition boundaries of the corresponding second set of data partitions;
perform the join operation subsequent to the first interval values and the second interval values of all of the storage regions of the second table having been compared to the partition boundaries of the second set of the data partitions, wherein the join operation is performed on data in the first and the second set of the data partitions having partition boundaries in common.

4. The apparatus of claim 1, wherein the data operation includes clustering and the processor is further configured to:
sort the data scanned from the storage regions in each of the data partitions to form clustered data based on the first interval values; and
repeat the sorting of the first interval values, the scanning into the data partitions and the sorting of the scanned data in the data partitions until the data are clustered across the data partitions to meet a clustering criterion.

5. The apparatus of claim 4, wherein the processor is further configured to:
reconfigure the partition boundaries so that a decreased amount of the sorted data is contained within corresponding data partitions; and
repeat the reconfiguring of the partition boundaries along with the sorting of the first interval values, the scanning into the data partitions and the sorting of the scanned data in the data partitions until the data are clustered across the data partitions to meet the clustering criterion, wherein
a final reconfiguring of the partition boundaries results in no more than the predetermined maximum number of partition boundaries being crossed by any of the respective value ranges.

6. A computer program product for performing a data operation, the computer program product comprising:
a computer readable storage medium having program instructions embodied therewith, the program instructions being executable by a processor to cause the processor to:
order first interval values of a plurality of data distribution statistics entries stored within a persistent storage component, each of the plurality of data distribution statistics entries corresponding to a respective storage region of a plurality of storage regions of the persistent storage component, each of the plurality of storage regions storing rows of a data table, including column data, and being associated with an interval including a first interval value and a second interval value indicating a value range for values of a data item of the column data across rows stored within that storage region, wherein an order of the first interval values determines a scanning order for the plurality of storage regions;
define a plurality of data partitions in a working memory component, the data partitions having respective partition boundaries that define respective value ranges for values of the data item, the defining of the plurality of data partitions logically reorganizing data in the data table to reduce a number of data transfers between the persistent storage component and the working memory component by limiting a number of the partition boundaries that are crossed by any of the respective value ranges to a predetermined maximum number;

scan at least some of the plurality of storage regions in the scanning order into the plurality of data partitions to arrange data from the storage regions in at least a partially ordered sequence for the data operation; and perform the data operation on the data in the plurality of data partitions one data partition at a time.

7. The computer program product of claim 6, wherein the computer readable storage medium includes further program instructions that cause the processor to:

store, in the corresponding data partitions, logical references to any of the storage regions for which the first interval value and the second interval value fall completely within the partition boundaries of the corresponding data partition; and delay the scanning of the storage regions for which logical references thereto are stored in the corresponding data partitions until the first interval values and the second interval values of all of the storage regions have been compared to the partition boundaries.

8. The computer program product of claim 7, wherein the data operation includes joining a first table and a second table and the computer readable storage medium includes further program instructions that cause the processor to:

scan the storage regions of the first data table into a corresponding first set of the partitions;

store, in a corresponding second set of the data partitions, the logical references to any of the storage regions of the second table for which the first interval value and the second interval value thereof fall within the partition boundaries of the corresponding second set of data partitions;

perform the join operation subsequent to the first interval values and the second interval values of all of the storage regions of the second table having been compared to the partition boundaries of the second set of the data partitions, wherein the join operation is performed on data in the first and the second set of the data partitions having partition boundaries in common.

9. The computer program product of claim 6, wherein the data operation includes clustering and the computer readable storage medium includes further program instructions that cause the processor to:

sort the data scanned from the storage regions in each of the data partitions to form clustered data based on the first interval values; and repeat the sorting of the first interval values, the scanning into the data partitions and the sorting of the scanned data in the data partitions until the data are clustered across the data partitions to meet a clustering criterion.

10. The computer program product of claim 9, wherein the computer readable storage medium includes further program instructions that cause the processor to:

reconfigure the partition boundaries so that a decreased amount of the sorted data is contained within corresponding data partitions; and repeat the reconfiguring of the partition boundaries along with the sorting of the first interval values, the scanning into the data partitions and the sorting of the scanned data in the data partitions until the data are clustered across the data partitions to meet the clustering criterion, wherein a final reconfiguring of the partition boundaries results in no more than the predetermined maximum number of partition boundaries being crossed by any of the respective value ranges.

* * * * *